(12) United States Patent
Sieling

(10) Patent No.: US 7,546,963 B2
(45) Date of Patent: Jun. 16, 2009

(54) CENTRE PIVOT IRRIGATORS

(76) Inventor: Nicolaas Laurisse Sieling, Murray Gwynne Farm The Coach Road, Mulwala (AU) NSW 2647

(*) Notice: Subject to any disclaimer, the term of this patent is extended or adjusted under 35 U.S.C. 154(b) by 124 days.

(21) Appl. No.: 11/578,989

(22) PCT Filed: Apr. 14, 2005

(86) PCT No.: PCT/AU2005/000524

§ 371 (c)(1),
(2), (4) Date: Oct. 19, 2006

(87) PCT Pub. No.: WO2005/102029

PCT Pub. Date: Nov. 3, 2005

(65) Prior Publication Data

US 2007/0221763 A1 Sep. 27, 2007

(30) Foreign Application Priority Data

Apr. 20, 2004 (AU) .............................. 2004902059

(51) Int. Cl.
*B05B 3/00* (2006.01)
*B05B 3/18* (2006.01)
(52) U.S. Cl. ..................... 239/728; 239/730; 239/736
(58) Field of Classification Search ......... 239/722–748, 239/450
See application file for complete search history.

(56) References Cited

U.S. PATENT DOCUMENTS

| 3,703,990 | A | * | 11/1972 | Erickson | 239/11 |
|---|---|---|---|---|---|
| 3,802,627 | A | * | 4/1974 | Seckler et al. | 239/729 |
| 4,432,494 | A | * | 2/1984 | Hunter | 239/729 |
| 4,569,481 | A | * | 2/1986 | Davis et al. | 239/729 |
| 4,877,189 | A | * | 10/1989 | Williams | 239/749 |
| 5,695,129 | A | * | 12/1997 | Korus | 239/729 |
| 6,095,439 | A | * | 8/2000 | Segal et al. | 239/729 |

* cited by examiner

*Primary Examiner*—Davis Hwu
(74) *Attorney, Agent, or Firm*—Young & Thompson

(57) ABSTRACT

Connecting apparatus for use with centre pivot irrigation equipment that includes a boom supported on ground wheels and made up of one or more pipes arranged to rotate about a water supply pipe to which the boom is connected. The apparatus is provided with a U-shaped flexible pipe assembly for connecting the boom to the water supply pipe so as to enable the boom to move radially towards and away from the water supply pipe as it rotates while remaining connected thereto. This radial movement causes the distance between the ground wheels and the water supply pipe to vary and reduces the damage caused to a crop and the land in the path of the wheels. The apparatus includes a structure that is rigidly connected to the inner end of the boom. The structure may include rails that slide over a seat mounted on the water supply pipe.

11 Claims, 8 Drawing Sheets

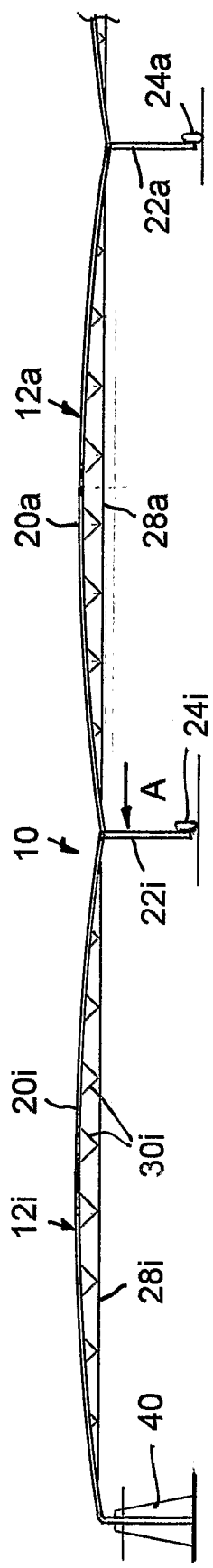
Fig.1 - Prior Art
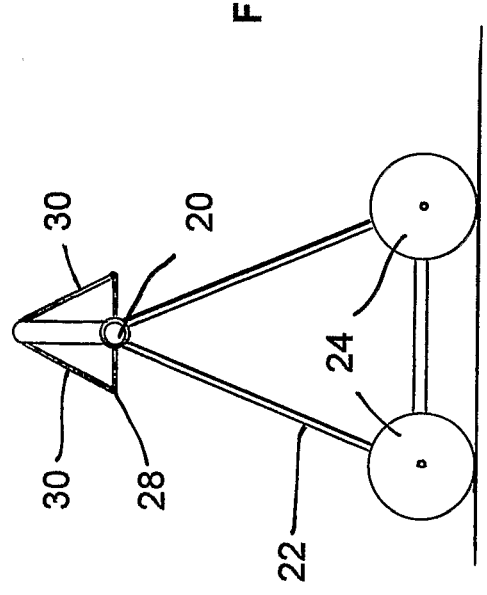
Fig. 2 - Prior Art

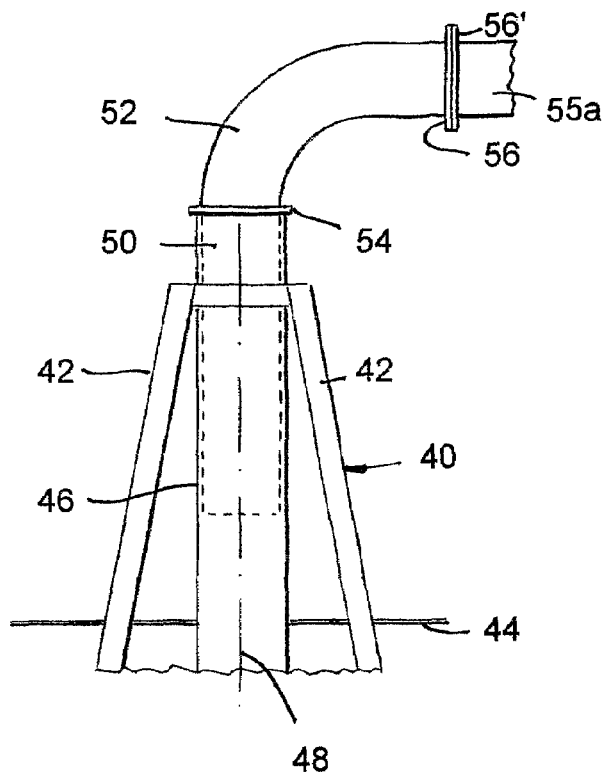
Fig 3. Prior Art
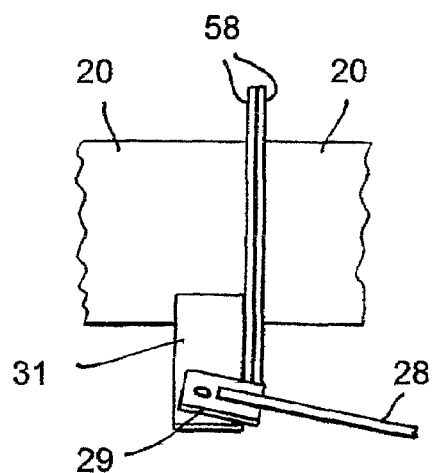
Fig. 4 - Prior Art
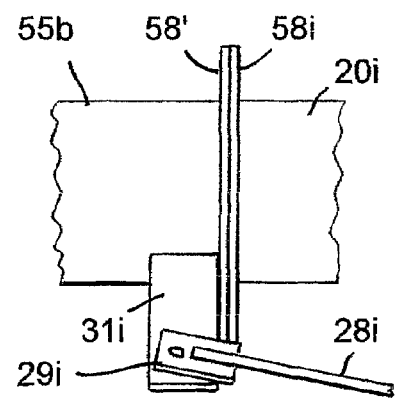
Fig 5 - Prior Art Fig. 6
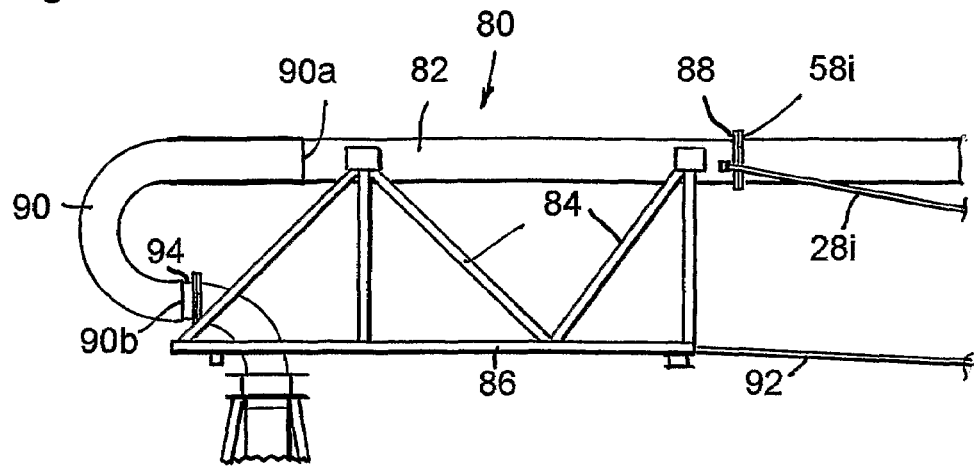
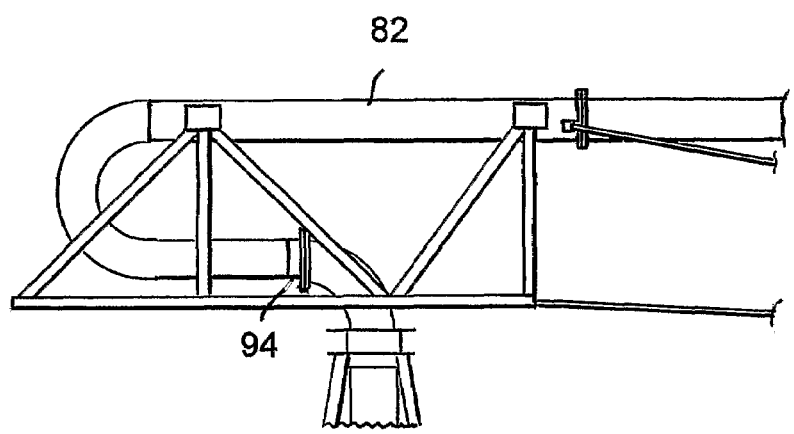
Fig. 7
Fig. 9
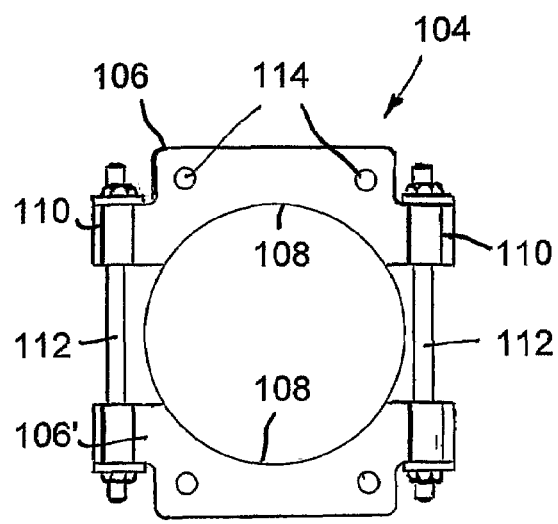

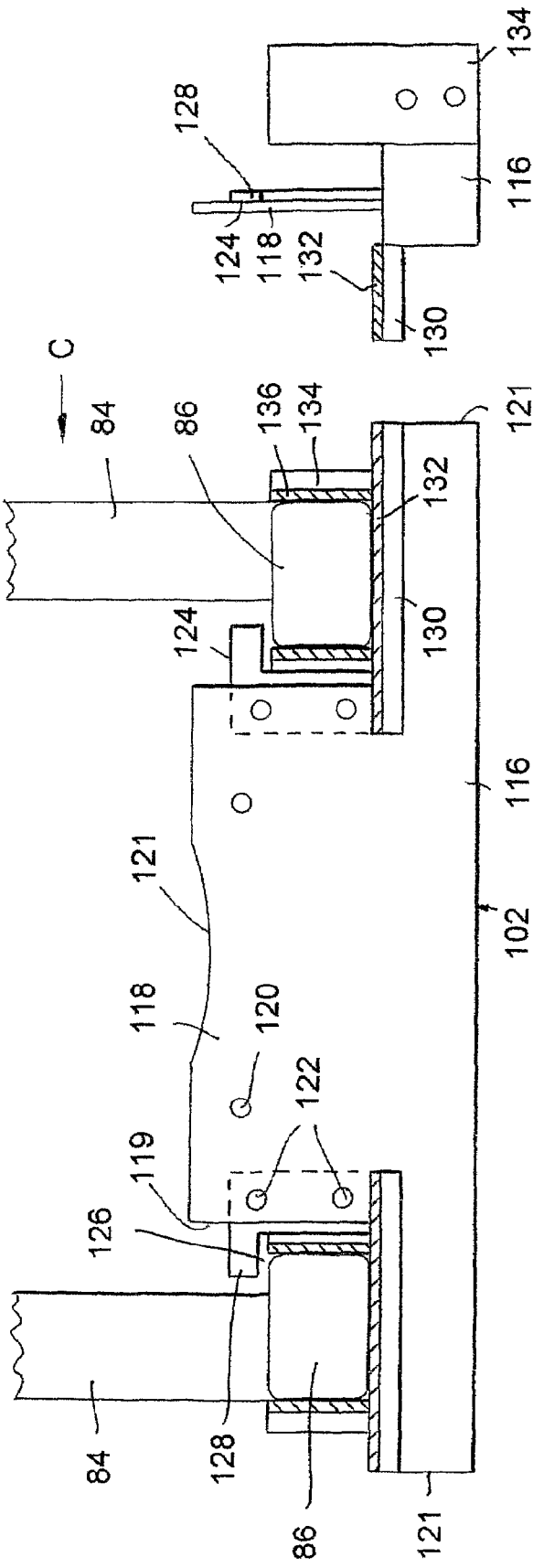

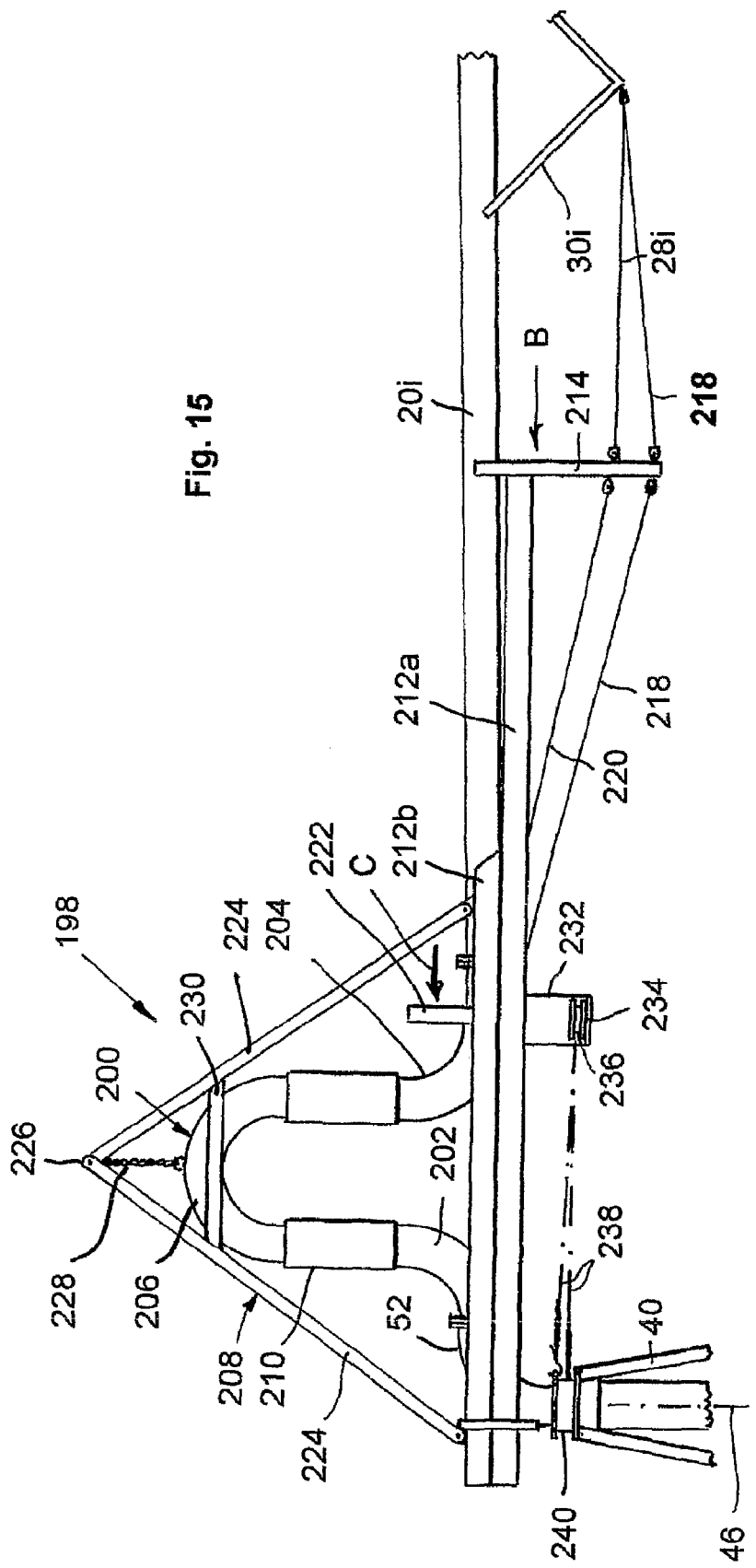

CENTRE PIVOT IRRIGATORS

FIELD AND BACKGROUND OF THE INVENTION

This invention relates to centre pivot irrigators.

Centre pivot irrigators have become widely accepted in farming practice. Typically, a centre pivot irrigator comprises a single pipe or, perhaps more often, a number of rigid pipes joined together end to end. In either case, the pipe or pipes form an elongate boom. The boom has an inner end anchored to a turret that is fixed in the ground and is designed in such manner, discussed below, that the boom is able to pivot about a fixed pivotal axis located at the turret. As it pivots, the boom is supported above the ground by the turret at the inner end and by pairs of ground wheels carried on triangulated supporting frames mounted one on each pipe. The ground wheels are driven in tandem by suitable means such as electric or hydraulic motors, causing the boom to pivot. When the boom has pivoted through 360°, it has passed over a circular piece of land. During this movement, irrigation water is pumped into the pipes making up the boom from a water supply pipe in the turret and discharged onto the land through outlets located at intervals along the pipes.

In this specification and the claims, the terms "pivoting" and "rotating" are used interchangeably when used with reference to the boom and, to avoid repetition, can be taken to mean "pivoting or rotating about the pivotal axis".

Centre pivot irrigators vary in size from relatively small to quite large. For example, in the test prototype for the present invention, the boom comprises 11 pipes each of 50 meters in length. The area irrigated by the prototype is thus about 95 hectares. The scope of the present invention is not limited by the size of the irrigator nor to the type just described.

The above description is highly simplified. Commercially available centre pivot irrigators are provided with many sophisticated features that will not be described in more detail herein except where such detail is relevant to an understanding of the present invention.

In all centre pivot irrigators known to the applicant, each of the wheels remains at a substantially fixed distance from the pivotal axis as the boom rotates. This arises from the characteristic that the supporting frames and hence the wheels are mounted in fixed positions on the pipes and that the pipes are constrained to stay in a substantially straight line as the boom rotates. As a result, each wheel passes over the same piece of ground repeatedly as the boom rotates and it is well known that this can seriously damage or even destroy any crop growing in the path of the wheels. Furthermore, the land traversed by the wheels tends to deteriorate, forming channels and ruts. The channels and ruts can become deep enough to prevent the passage of tractors, mowers and other farm machinery as well livestock and the irrigator itself during subsequent passes. The ruts can impose considerable strain on the gearboxes, drive shafts and other components of the irrigator as the wheels have to repeatedly lift the irrigator up and out of potholes within the ruts. The ruts also can also cause damage to vehicles such as farm bikes and their riders because the ruts are often deep and almost invisible until the rider is on top of them. So the ruts become a safety issue. They also interfere with the run off of water from the land, creating boggy patches that are made even worse by subsequent passes of the irrigator.

Attempts have been made in the past to address these disadvantages. These attempts have included the laying of rocks, concrete or the like in the path of the wheels. This is expensive. When it is considered that each strip of land that is affected by the wheels can, in the experience of the applicant, be up to 2 meters wide, the cost to the farmer is significant. Other attempts include the fitting of so-called "boom backs" which spray the water out behind the irrigator with the intention that the ground on which the wheels run will be drier. Many manufacturers have recommended special "turf" tyres in soft ground applications. The Valley company of the USA offers a "third wheel" option to reduce the load on the two wheels mounted on each supporting frame.

STATEMENTS OF INVENTION

According to the invention, for use with irrigation equipment that includes a pipe assembly comprising one or more water delivery pipes arranged to rotate about a central location while being supported above the ground by one or more ground wheels, there is provided connecting apparatus for connecting the pipe assembly to a water supply facility in such manner as to enable the pipe assembly to rotate about the central location while remaining connected to the water supply facility, and means to vary the distance between the or each ground wheel and the central location as the pipe assembly rotates.

In one form of the invention, the connecting apparatus comprises means to connect an inner end of the pipe assembly to the water supply facility and a supporting structure arranged to be supported by the water supply facility and to support the inner end as the pipe assembly rotates.

According to one aspect of the invention, the connecting apparatus comprises a support member that is mountable on the water supply facility and over which the supporting structure is arranged to slide as the pipe assembly rotates.

Advantageously, according to the invention, the supporting structure is arranged to embrace the water supply facility, serving to hold the pipe assembly in radial alignment with the central location as the pipe assembly rotates.

In one form of the invention, the means to connect the inner end of the pipe assembly to the water supply facility comprises a flexible pipe that joins the pipe assembly to the water supply facility in such manner as to enable the distance between the pipe assembly and the water supply facility to vary as the pipe assembly rotates. In one aspect of the invention, the flexible pipe has one end that is connected to the water supply facility and an opposite end that is connected to the pipe assembly.

Conventional centre pivot irrigators of one known type are connected to a water supply facility that includes a water supply pipe at least part of which has an uprightly disposed longitudinal axis about which the boom rotates. The supply pipe, which conventionally forms part of what is called the turret in the foregoing description, is arranged to support the inner end of the boom and to rotate about its longitudinal axis as the boom rotates.

In one form of the invention, for use with irrigation equipment of this type, the connecting apparatus is arranged to connect the pipe assembly to the supply pipe and is provided with means to vary the distance between the or each ground wheel and the supply pipe as the pipe assembly rotates.

In most if not all conventional centre pivot irrigators, the wheels are mounted so that their rotational axes are parallel to the longitudinal axis of the boom. As a result of the fact that the boom pivots about a fixed pivotal axis, each wheel is constrained to follow a circular path centred on the pivotal axis and tends to steer itself in a direction that is tangential to the circular path. This has the result that the wheels exert a force that tends to move the boom radially outwardly from the pivotal axis. This characteristic is made use of by providing, in one form of the present invention, that the means to vary the distance between the or each ground wheel and the central location as the pipe assembly rotates comprises a flexible connector, a take up member that can be mounted on the water supply facility, and means for mounting the flexible connector between the pipe assembly and the take up member in such manner that, as the pipe assembly rotates, the flexible connector can be wound onto or off the take up member to thereby cause the distance between the pipe assembly and the central location to vary.

The flexible connector is kept taut by the action of the aforementioned force exerted on the boom by the wheels. By virtue of the fact that the connecting apparatus is connected to the pipe arrangement, the flexible connector draws the pipe arrangement in towards the pivotal axis when the flexible connector is being wound onto the take up member and allows the pipe arrangement to move outwardly away from the pivotal axis when the flexible connector is being wound off the take up member.

According to one aspect of the invention, the take up member is cylindrical and is mounted on the water supply pipe, coaxially therewith but anchored on a part of the water supply facility that does not rotate with the supply pipe. In one aspect of the invention, the connecting apparatus comprises a member that can be mounted on the connecting apparatus and around which the flexible connector can be passed, with one end of flexible connector anchored on the take up member and an opposite end of the flexible connector that on the water supply facility.

Advantageously, according to the invention, the flexible pipe is disposed in a U shape when it is in use. One leg of the U can be connected to the delivery end of the water supply pipe and the other leg of the U can be connected to the inlet end of the rigid pipe. Where the rigid pipe and the delivery end of the water supply pipe are substantially horizontally disposed (as they are in many conventional installations), the legs of the U in one aspect of the invention may also be substantially horizontally disposed. In this case, the legs of the U are advantageously disposed one above the other.

According to another aspect of the invention, the connecting apparatus comprises means to enable the pipe assembly to move radially in relation to the central location as the pipe assembly rotates.

It is an advantage of the present invention that the connecting apparatus may be retro-fitted to existing irrigator assemblies whether any such assembly comprises a boom that comprises a single pipe or a number of interconnected pipes.

BRIEF DESCRIPTION OF THE DRAWINGS

The invention is further discussed with reference to the accompanying drawings, which illustrate various features of the invention carried into practice. In the drawings:

FIG. 1 is a very much simplified side schematic view of two spans of a centre pivot irrigator;

FIG. 2 is a view on arrow A in FIG. 1 in larger scale;

FIG. 3 is a side view of a turret that is part of the irrigator, in still larger scale;

FIGS. 4 and 5 show details of parts of the irrigator;

FIGS. 6 and 7 are side views of a connecting structure that is supported on the turret of an irrigator and joins the inner end of the boom to the supply pipe of the irrigator;

FIG. 9 is partial cross sectional view on Arrow B in FIG. 8;

FIG. 11 is also a partial cross sectional view on Arrow B in FIG. 8;

FIG. 12 is a view on Arrow C in FIG. 11;

FIG. 15 is a side view, similar to FIG. 8, of an alternative connecting structure.

DETAILED DESCRIPTION OF EXAMPLES OF THE INVENTION SHOWN IN THE DRAWINGS

Figure 8:
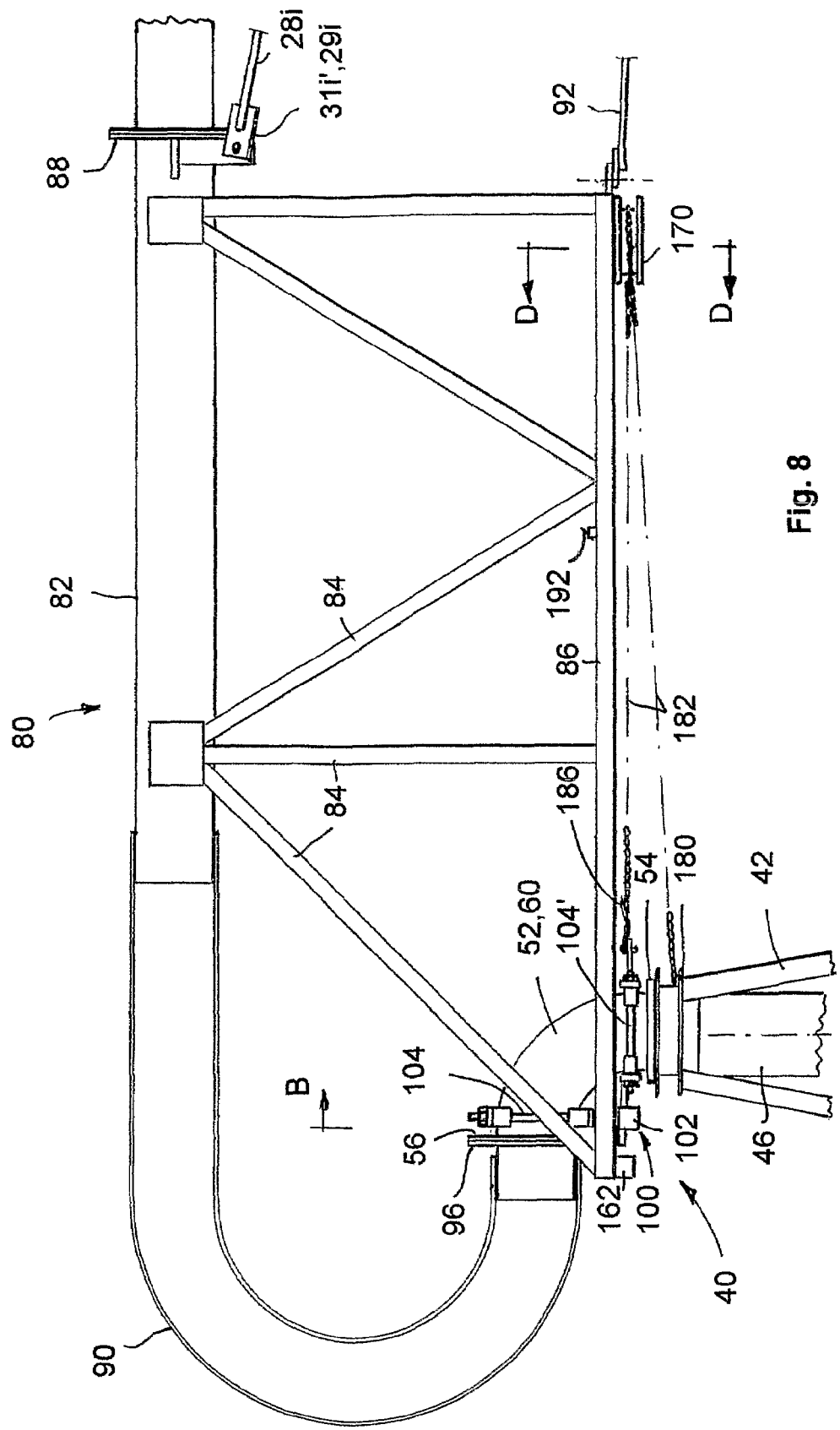
FIG. 8 is an enlarged side view, similar to FIG. 6, of the connecting structure.

For the sake of avoiding repetition, in this specification the use of the phrase "in the present example" or words to the same effect is intended to indicate that what is being described is by way of illustrative example. In such cases it should be clear from the context that what is being described can be changed and that there is no intention that the scope of the invention be limited thereto. The nature of many of such changes should also be clear to the instructed reader. On the other hand, there is no intention that, in the absence of a phrase of the same kind, the scope of the invention is to be limited to any matter described unless this appears from the context.

FIGS. 1-5 of the drawings are illustrations of prior art, showing an installation that comprises an existing centre pivot irrigator 10. The irrigator is an eleven-span product of the Reinke company of the USA. Only minimal modifications need be made to the irrigator to enable it to be used in accordance with the invention and there is thus no need to describe the components thereof in more detail than is necessary to understand the invention.

Most of the spans of the original irrigator comprise substantial identical components. In the following description and the drawings, the numerals used to identify such components, where they are referred to generically, are used without a suffix. Where suffixes are used, the numerals indicate the components of particular spans.

The part of the irrigator 10 shown in FIG. 1 comprises the inner span 12i and one of the outer spans 12a of the irrigator's boom. Each span comprises an elongate pipe 20 that is supported on a triangulated supporting frame 22 provided with a pair of ground wheels 24. The ground wheels are coupled to an electric motor (not shown). The supporting frame 22i and wheels 24i of the inner span 12i are mounted at the outer end of the pipe 20i. Similarly, the supporting frame 22a and wheels 24a of the first outer span 12a are mounted at the outer end of the pipe 20a. The inner ends of the pipe 20 are connected to the outer ends of the adjacent pipes by flanges 58. This arrangement is repeated for each of the additional outer spans. The pipes 20 are thus supported generally parallel to the ground with the result that the pipes 20 of the eleven spans collectively form a boom comprising, in effect, a single pipe having a length of about 550 meters. In the installation as originally supplied by the manufacturer, the inner end of the pipe 20i is connected to and supported above the ground by a turret 40. Irrigation water is pumped into the boom from the turret. The water is discharged onto the ground through outlets (not shown) located at regular intervals along the pipes 20 and provided with sprinklers (also not shown).

The pipes 20 must be strong and rigid enough to bear the pressure and weight of the water and also the forces applied to the pipes as the boom moves over the ground. To this end, each pipe 20 of the boom as originally supplied by the manufacturer is preformed with an upwardly arched shape as can be seen in FIG. 1. This shape is maintained by a bracing arrangement in the form of tie rods 28 that extend between the ends of the pipes. The tie rods are spread apart and held in place by pairs of spreader arms 30 mounted at intervals on the pipes 20. An end plate 29 is welded on each end of each tie rod. The tie rods are attached to the ends of the spreader arms by means of bolts that pass through holes in the spreader arms and the end plates. In general, at a joint between one pipe and an adjacent pipe, the tie rods 29 at the end of the one pipe connect the outermost spreader arms at that end to lugs 31 welded to the end of the adjacent pipe. One such lug 31 together with the end plate 29 of the tie rod 28 that is bolted to the lug, is shown in FIG. 4.

Sophisticated controls are provided for various functions including keeping the pipes 20 in mutual alignment and metering the quantity of water discharged through each outlet. This quantity varies on account of the fact that the further any particular outlet is from the turret, the faster it travels over the ground and the greater is the area of ground that must be watered by that outlet. It is not necessary to change the operation of the controls for the purposes of the invention and there is therefore no need to describe them.

As shown in FIG. 3 the turret 40 comprises a supporting framework 42 fixed in the ground. In the installation shown, the turret is located in a building and projects above the roof 44 thereof. However, the turret could be self-standing as it is in most installations. At its centre the turret supports a water supply pipe 46 with its longitudinal axis 48 vertically disposed. At its lower end the pipe 46 is connected to a pump (not shown) that delivers irrigation water to the pipe 46 and thence to the pipes 20. A second pipe 50 is inserted in the upper end of the pipe 46. The pipe 50 is a close fit in the pipe 46 but is nevertheless able to rotate therein. A 90° elbow 52 is welded to the upper end of the pipe 50 and a collar 54 is welded to the outside of the pipe 50 below the elbow. The collar bears on the upper end of the pipe 46. A flange 56 is welded on the outer end of the elbow 52.

For convenience, the assembly comprising the pipes 46, 50 and the elbow 52 will be referred to as the water supply pipe S.

In the irrigator as supplied by the manufacturer the elbow 52 is connected to the inner end of the pipe 20*i* through a connecting pipe assembly incorporating a flexible joint. This assembly is referred to herein as assembly C but is not shown in detail in the drawings as the assembly is removed for the purposes of the invention. Only the ends 55*a*, 55*b* of the assembly C are shown. The ends 55*a*, 55*b* are provided with flanges 56', 58' that are bolted to the respective flanges 56, 58*i* as shown in FIGS. 3, 4. The assembly C is arranged to support the weight of the inner pipe 20*i* while at the same time allowing it to move up and down to accommodate undulations in the land as the boom rotates.

Driven by the wheels 24, the boom pivots about the turret 40 and, more particularly, about the axis 48. In this movement the pipe 50 rotates in the pipe 46 enabling irrigation water to be delivered to the pipes 20. Seals (not shown) are provided to prevent leakage of the water past the interface between the pipes 46, 50. Furthermore, means (not shown) are provided to prevent the pipe 50 from being forced upwardly out of the pipe 46 by the pressure of the water.

All of the components that have heretofore been described with reference to FIGS. 1-5 are part of the irrigator as supplied by the manufacturer.

As already mentioned, the assembly C originally supplied with the irrigator is removed. In this condition there is a distance of about 20 cm between the flange 56 at the outer end of the elbow 52 and the flange 58*i* at the inner end of the pipe 20*i*. The elbow 52 is rotated through 180° so that, in this position, there is now a distance of about 2 meters between the flange 56 and the flange 58*i*. A structure 80 is located between the pipe 20*i* and the elbow 52 and, essentially, takes the place of the assembly C while at the same time allowing the boom to move radially towards or away from the axis 48. The assembly C does not allow such movement.

The structure 80 comprises in the first place a pipe 82 joined by means of struts 84 to a pair of rails 86 located below the pipe 82. Each rail 86 is made up of a steel pipe of rectangular cross section. The rails 86 are held spaced apart by cross members that will be described later. The rails 86 are located one on either side of the supply pipe. The pipe 82 carries at one end a flange 88 that is bolted to the flange 58*i* on the inner end of the pipe 20*i*. The diameter of the pipe 82 is the same as that of the pipe 20*i* and the elbow 52.

Lugs 31*i'* are mounted on the outer end of the pipe 82 in a location corresponding to the position that the lugs 38*i* occupied on the pipe 55*b*. The tie rods 28*i* adjacent the inner end of the inner pipe 20*i* are bolted to the lugs 31*i'* through end plates 29*i*. Additional tie rods 92 are mounted between the rails 86 and the lower ends of the inner spreader arms 30' on the pipe 20*i*.

The structure 80 is rigidly fixed to the inner end of the pipe 20*i* and forms an extension thereto. In use the rails 86 are located one on either side of the supply pipe S and are slidably supported thereon by a support assembly 100 mounted on the elbow 52.

The support assembly 100 comprises a support bar 102 held in place by two clamp assemblies 104, 104' that are mounted on the elbow 52. In use, the assembly 104 is clamped in vertical position to the elbow 52 adjacent the upper end thereof and the assembly 104' is clamped in horizontal position to the elbow adjacent the lower end thereof. Aside from this the clamp assemblies are substantially identical so only one of them will be described. The assembly 104 comprises two connecting plates 106, 106' of similar shape, mounted in diametrically opposed locations on either side of the elbow. Curved recesses 108 are formed in the inner edge of each plate 106, 106'. The recesses conform to the outer face of the elbow with which they are in contact. Short lengths of pipe 110, 110' are welded to each of the opposite side edges of the respective plates 106, 106'. The pairs of pipes 110, 110' at the respective side edges are axially aligned. The plates 106, 106' are clamped to the elbow 52 by stud bolts 112 that pass through the aligned pairs of pipes 110. A pair of holes 114 is drilled in each plate 106, 106' adjacent the outer edge thereof.

The support bar 102 is comprised of a length of steel tube 116 of square cross section that passes under the rails 86 of the structure 80. An upstanding mounting plate 118 is welded to the upper face of the tube 116. The ends 119 of the mounting plate are at equal distances from the outer ends 121 of the tube 116. A first pair of holes 120 are drilled in the mounting plate adjacent the upper edge thereof which has a recess 121 with the same curvature as the recess 108 in the plate 106'. The holes 120 receive bolts by means of which the mounting plate 118 is fixed to the plate 106'. Two further holes 122 are drilled in the mounting plate near each outer end 119. These holes 122 receive bolts by means of which locking plates 124 are bolted to the ends of the mounting plate 118. Recesses 126 are formed in the outer edges of the locking plates, defining shoulders 128 that overlie the rails 86 and prevent the structure 80 from being unintentionally lifted off the support assembly in use.

Two horizontally disposed lugs 130 are welded to the back side face of the tube 116. The lugs 130 are located at equal distances from the outer ends 121 and in line with the respective rails 86. A pad 132 of low friction material such as Teflon is fixed to the upper face of the each lug 130. Similarly, pairs of vertically disposed lugs 134 are welded to the front side face of the tube 116. The lugs 134 project upwardly and are disposed with clearance on either side of the respective rails 86. Pads 136 of the same low friction material are fixed to the inner face of each lug 134.

A horizontally disposed plate 138 is welded to the front side face of the tube 116. The plate 138 is similar to the mounting plate 118 and is bolted to the plate 106' of the horizontally disposed clamping assembly 104'.

In use, the support bar 102 is suspended by the clamping assembly 104 and prevented from moving in the axial direction of the boom by the clamping assembly 104'. The support bar bears the weight of the structure 80, the rails 86 bearing on the padded lugs 130 and being capable of sliding thereover. The rails 86 are retained between the padded lugs 134 and thus prevented from sliding sideways off the lugs 130.

Figure 10:
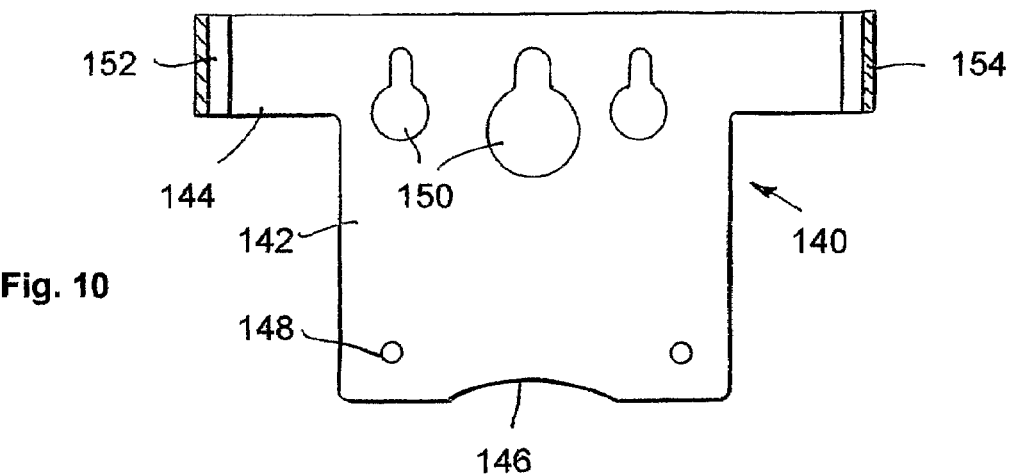
FIG. 10 is a plan view of one of the components of the connecting structure.

An anchoring plate 140, illustrated in plan in FIG. 10, is bolted to the plate 106 of the horizontal clamping assembly 104'. The anchoring plate is roughly T-shaped, comprising a central leg 142 and two arms 144 located adjacent the outer end of the leg and projecting to either side thereof. Adjacent the inner end of the leg, which has a recess 146 with the same curvature as the recess 108 in the plate 106 of assembly 104', two holes 148 are drilled in the leg for accommodating bolts by means of which the anchoring plate 140 is bolted to the same plate 106. Three keyhole slots 150 are formed in the plate 140 adjacent the outer end of the leg 142. A chain can be anchored in any of these slots as will be described. Upstanding side plates 152 are welded to the ends of the arms 144. Pads 154 of the same low friction material as previously described are fixed to the outer faces of the side plates 152. The side plates 152 are positioned so that the pads are close to the inner side faces of the respective rails 86. As the boom rotates, carrying with it the structure 80, one of the rails 86 comes into contact with the pad 154 on the adjacent side plate, causing the clamping assembly 104' and hence the supply pipe S to rotate with the boom. At the same time, if the boom moves in the radial direction, the rails 86 are able to slide past the side plates 152.

Figure 13:
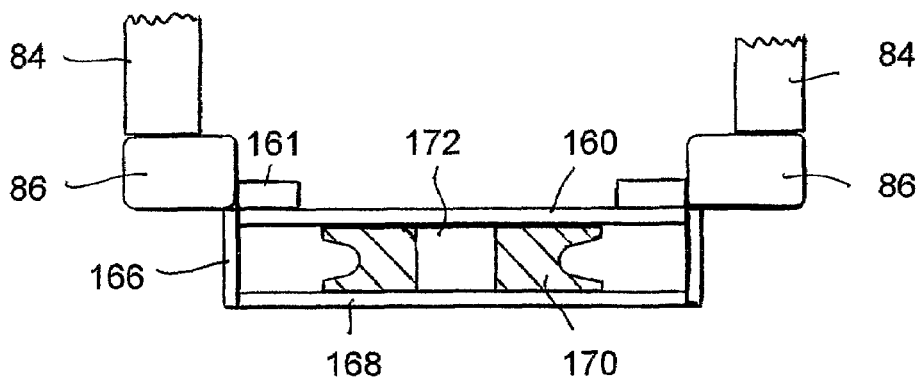
FIG. 13 is a cross sectional view on Arrows D-D in FIG. 8.

The aforementioned cross members that hold the rails 86 apart include a cross plate 160 and a tube 162 of square cross section located at the respective front and back ends of the structure 80. The tube 162 is welded to the lower faces of the rails 86. As shown in FIG. 13, the cross plate 160 is bolted to lugs 161 welded to the inner side faces of the rails 86. Downwardly projecting spacer plates 166, located adjacent the ends of the cross plate 160, are welded to the edges of the cross plate 160. The spacer plates 166 carry a second cross plate 168 identical to the cross plate 160. A chain pulley 170 rotates about a pin 172 seated in holes drilled in the spacer plates.

One end 90a of a flexible rubber pipe 90, suitably reinforced to take the pressure of the water delivered to the boom, is mounted over the free end of the pipe 82. The other end 90b of the rubber pipe 90 is mounted over one end of a short pipe 94 carrying a flange 96 that is bolted to the flange 56 on the elbow 52. The rubber pipe 90 thus takes up the shape of a U with its legs one above the other and horizontally disposed.

Figure 14:
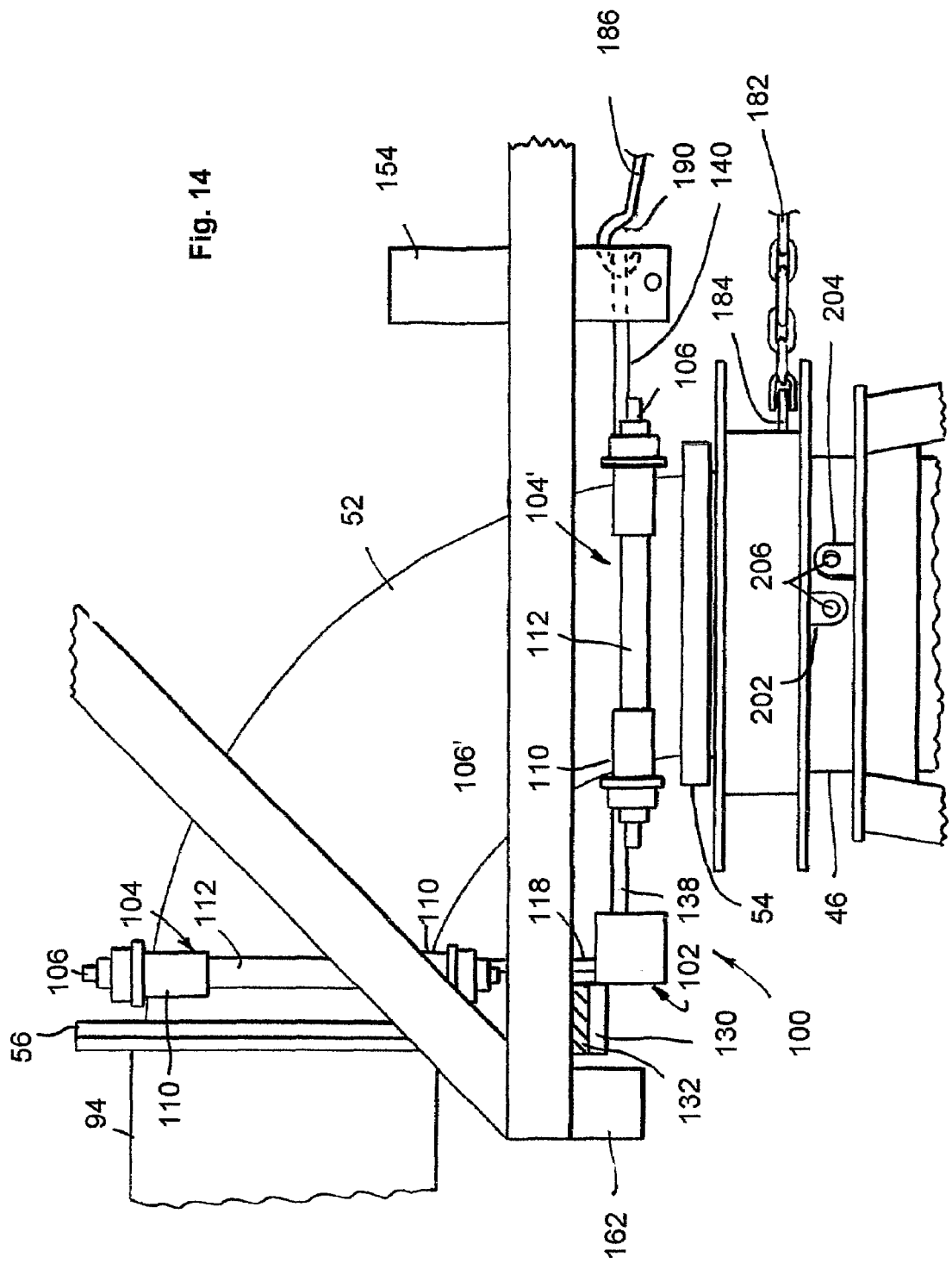
FIG. 14 is a side view, still further enlarged, of a modified part of the connecting structure.

Referring to FIG. 14, in addition to the structure for supporting the pipe 20i, the modifications to the original installation include the provision of a flanged steel drum 180 that, in one version of the apparatus, is welded to the top of the turret. The drum 180 surrounds the pipe 46 and is disposed coaxially therewith. The upper end of the pipe 46, on which the collar 54 rests, is flush with the upper face of the drum. One end of a chain 182 is connected to a lug 184 welded to the drum. The chain is passed around the pulley 170 and connected to a commercially available tensioning device 186 with an over centre locking action. A hook 190 on the end of the tensioning device 186 is anchored in a convenient one of the keyhole slots 150 in the anchoring plate 140. The device 186 is used to take up slack in the chain after it has been attached.

To install the supporting structure 80, the pipe 20i is supported by a crane or other suitable device capable of lifting the pipe 20i to a higher level. As mentioned above, after the connecting assembly C is detached, the elbow 52 is rotated about axis 48 through 180° to take up the position shown in FIGS. 6-8 and 15. After mounting the clamp assemblies 104, 104' on the elbow 52, the supporting structure 80 with the flexible pipe 90 attached is lifted into place and connected to the elbow 52 and the inner end of pipe 20i. For this purpose it is necessary first to raise the pipe 20i so that it is aligned with pipe 82. After the connection is made pipe 20i is lowered until the rails 86 of the supporting structure 80 rest on the padded lugs 130 so that the supporting structure itself supports the pipe 20i.

At this stage the supporting structure 80 will be in the position shown in FIG. 7, the boom being at a minimum radial distance away from the axis 48. One end of the chain is now attached to the lug 184 on the drum 180 and the chain 182 is wound several times around the around the drum 180 so that the length of chain around the drum is equal to the radial distance through which the rails 86 are able to slide over the lugs 130. The free end of the chain is then passed around the chain pulley 170. The tensioning device 186 is attached to the chain, hooked on the anchoring plate 140 and operated to take up the slack in the chain.

When the boom is set in motion in the appropriate direction it will commence to unwind the chain from the drum. This will effectively lengthen the portion of the chain that is clear of the drum and thus allow the boom to move radially outwardly away from the rotational axis 48 as the boom pivots. The action of the wheels tends to steer the boom radially outwardly from the rotational axis as previously described, thus keeping the chain under tension. In this radial movement the structure 80, supporting the weight of the inner end of the boom, is supported on the lugs 130, the rails 86 sliding over the pads 132. Eventually the chain is completely wound off the drum. This is equivalent to the distance between the boom and the axis 48 reaching a permissible maximum (as shown in FIG. 6). Thereafter, the chain starts to be wound back onto the drum and draws the boom back radially inwardly. When the distance between the boom and the axis 48 reaches a permissible minimum (as shown in FIG. 7) a limit switch 192 mounted on one of the rail 86s is tripped by the plate 152, bringing the boom to a stop and sounding an alarm to alert the operator.

The operator now operates the tensioning device 186 to slacken off the chain 182 and, after releasing the chain from the device 186, unwinds the chain and winds it in the opposite sense around the drum 180 before reattaching the chain to the device 186 and again taking up the tension. Only as much chain should be rewound on the drum as has been wound off. This will ensure that the boom does not move outwardly beyond the permissible maximum when it is again set to rotate. This rotation is in the direction in which the boom was previously travelling so that the chain will first be unwound from the drum and then again rewound. The result will be that the boom will first move radially outwardly and then back in again before it is brought to a stop.

In the installation being described the diameter of the drum 180 is about 280 mm so that its circumference is about 880 mm. Due to the provision of the pulley 170, the boom will move 440 mm inwardly for each 880 mm length of chain (corresponding to one revolution of the boom) taken up on the drum. If it is decided that the total radial distance through which the boom should be allowed to move is a maximum of, say, 1760 mm, the boom will traverse this radial distance in four revolutions. In the installation described, the width of the tyres on the wheels is about 400 mm and it takes about 5 days for the boom to complete one revolution. At the extreme outer and inner limits of radial movement of the boom, the tyres will therefore roll over the land once in 40 days. Halfway between these limits, the tyres will roll over the land once in 20 days. A short sector of the land just inside the outer limit of radial travel, and another sector just outside the inner limit will be traversed as the boom moves radially outward and then again as it moves radially inward with an interval of at least 10 days therebetween. The arrangement of the invention substantially reduces the rate at which ruts appear in the land. Furthermore, the longer intervals substantially increase the chances that grass and many other crops grown that the wheels roll over will survive. This benefit is exacerbated by the fact that water trapped in any small indentations in the path of a tyre has a much increased chance of evaporating or soaking in and allowing the soil to become harder before it is again traversed by the same tyre.

The provision of the flexible pipe 90 allows the delivery of water to the boom to be maintained while the radial movement of the boom takes place.

The apparatus described above with reference to the drawings represents only one example of carrying the invention into practice. One advantage thereof is that only minor modifications need be made to an existing installation in order install the flexible pipe and supporting structure 80.

In FIG. 15, there is shown an alternative structure 198 comprising an assembly 200 of pipes including a first 90° elbow 202 connected to the pipe 20*i*. The tail portion of elbow 202 projects upwardly. A second 90° elbow 204 is connected to elbow 52 of the supply pipe. The tail portion of elbow 204 also projects upwardly. A 180° elbow 206 is suspended above the upwardly projecting tail portions of elbows 202, 204 by a gantry 208. The elbow 206 is inverted, having downwardly projecting tail portions that are connected to the tail portions of the respective elbows 202, 204 by flexible tubes 210 made of suitable fabric.

The structure 198 supports the weight of the pipe assembly 200 and the inner pipe 20*i* while the allowing the boom to move radially towards or away from the axis 46. At the same time the gantry ensures that the elbow 52 of the supply pipe pivots with the boom and stays lined up with the boom. The gantry comprises in the first place a pair of beams 212 that are spaced apart with the pipe 20*i* located therebetween and to which it is joined. Each beam 212 is made up of two steel pipes 212*a*, 212*bb* of rectangular cross section, welded together. The ends of the pipes 212*a*, which are somewhat longer that the pipes 212*b*, are welded to a spreader bracket 214 mounted on the pipe 20*i* at a distance of about 2 m in from of the existing inner spreader arms 30*i*. The original inner tie rods 28*i* that were mounted between the existing inner spreader arms 30*i* and the lugs 29*i* on the pipe 20*i* are cut. Plates 216 are welded to the cut ends and are then bolted to lugs 218 welded to the bracket 214. Additional tie rods 218, 220 are fixed to the bracket 214. The tie rods 218 are located below the cut tie rods 28*i* and join the original inner spreader arms 30*i* to the lugs 29*i* The tie rods 220 are welded to the bracket 214 and to the pipes 212*a*. The tie rods 220 are positioned above the tie rods 218.

Adjacent the inner end of the pipe 20*i*, an upstanding suspension bracket 222 fabricated from steel tube is welded to the pipes 212*b*. The elbow 204 is suspended from the bracket 222 by steel straps 222.

The gantry comprises upstanding steel pipes 224 bolted to each beam 212. The pipes 224 are joined together at their upper ends to form a pyramidic arch with its apex 226 located approximately above the centre of the 180° elbow 206. The assembly 200 is suspended from the apex 226 by a chain 228 or tension spring. Cross braces 230 are mounted between the pipes 224 on either side of the elbow 206. The cross braces stiffen the arch and also serve to prevent excessive swaying of the suspended assembly 200.

Two downwardly projecting plates 232 are welded to the beam 212. A cross plate 234 is welded to the plates 232. A chain pulley 236 is mounted for rotation on the cross plate 234.

The beams 212 rest on a support arrangement that is mounted on the elbow 52. The beams are able to slide over the support arrangement which thus supports the inner end of the boom (including the weight of the assembly 200 and the gantry 208) while allowing the boom to move radially as it rotates about the axis 46. The support arrangement need not be described in detail as it is substantially similar to the assembly 100 that supports the structure 80 described above.

Similarly, the structure 198 includes a chain 238 that passes around the pulley 236. The structure also includes a drum 240 mounted on the turret 40. The drum 240 is substantially similar to the drum 180 described above. The ends of the chain 238 are anchored to the drum and the chain functions in the same way as the chain 182 described above to cause the boom to move radially as it rotates about the axis 46. This radial movement is taken up by the flexible pipes 210.

In a modification of the structure 198, the assembly 200 can be inverted. In this case the elbow 206 and the flexible pipes 210 hang downwardly without any need for the gantry 208 and the chain 228.

The flexible pipe arrangement for connecting the boom to the supply pipe can also take other forms. For example, the flexible pipe arrangement might comprise one pipe attached to the pipe 20*i* and capable of sliding axially (telescopically) in a straight pipe attached to the elbow 52. If the telescopic pipes were long and strong enough, they might be self supporting, eliminating the need for a structure to support them.

Similarly, means other than the chain arrangement described, could be used to bring about the radial movement of the boom. For example, the boom could be moved radially by automatically controlled double acting rams. In most cases, centre pivot irrigators are set up to rotate through a complete circle (i.e. 360°). However, in some circumstances, due for example to space constraints at the site, they are set up to reverse direction after rotating through only part of a circle. The present invention can be applied to irrigators arranged to operate in this manner. However, the means to bring about the radial movement of the boom might have to be suitably adapted for this purpose. For example, instead of arranging the one end of either chain 182, 238 to wrap around it's respective drum 238, 240, this end could be attached to a winch set up to draw the end of the chain in (or release it) at a predetermined speed as the boom rotates. The winch might be electrically, hydraulically or mechanically driven and automatically controlled, for example, by switches actuated by cams. The cams could be mounted on the turret and the switches on the boom—or vice versa.

FIG. 14 also shows a modification of part of the apparatus shown in the drawings. In this modification, the drum 180 is not fixed to the turret but is able to rotate about the pipe 46. A downwardly projecting lug 240 is welded to the lower flange of the drum. An upwardly projecting lug 242 is welded to the turret. The lugs are positioned so that they move into alignment when the drum is rotated. When they are so aligned, a locking bolt can be passed through holes 244 predrilled in the lugs. By this means the drum can be locked in position so that it is unable to rotate with respect to the pipe 46.

This modification has the advantage that it is unnecessary to release the chain 182 after the boom has been brought to a stop by the limit switch at the end of an irrigation cycle as described above. Instead the aforementioned locking bolt can be withdrawn from the holes 244 in the lugs and the drum can be rotated to first unwind the chain and then wind it back on in the opposite direction. After this the locking bolt can again be used to lock the drum on the turret.

It is not intended that recognised mechanical equivalents of and/or modifications of and/or improvements to any matter described and/or illustrated herein should be excluded from the scope of a patent granted in pursuance of any application of which this specification forms a part or which claims the priority thereof or that the scope of any such patent should be limited by such matter further than is necessary to distinguish the invention claimed in such patent from the prior art.

The invention claimed is:

1. Connecting apparatus for use with irrigation equipment that includes a pipe assembly comprising one or more water delivery pipes arranged to rotate about a central location while being supported above the ground by one or more ground wheels, the connecting apparatus being provided with means for connecting the pipe assembly to a water supply facility in such manner as to enable the pipe assembly to rotate about the central location while remaining connected to the water supply facility, and means to vary the distance between the or each ground wheel and the central location as the pipe assembly rotates, including a flexible connector, a take up member mounted on the water supply facility, and means for mounting the flexible connector between the pipe assembly and the take up member in a configuration to allow the flexible connector to be wound onto the take up member and therefore shorten the distance between the pipe assembly and the central location.

2. Connecting apparatus according to claim 1, comprising means to connect an inner end of the pipe assembly to the water supply facility and a supporting structure arranged to be supported by the water supply facility and to support the inner end as the pipe assembly rotates.

3. Connecting apparatus according to claim 2, comprising a support member that is mountable on the water supply facility and over which the supporting structure is arranged to slide as the pipe assembly rotates.

4. Connecting apparatus according to claim 3, in which the supporting structure is arranged to embrace the water supply facility, serving to hold the pipe assembly in radial alignment with the central location as the pipe assembly rotates.

5. Connecting apparatus according to claim 2, in which the means to connect the inner end of the pipe assembly to the water supply facility comprises a flexible pipe that joins the pipe assembly to the water supply facility in such manner as to enable the distance between the pipe assembly and the water supply facility to vary as the pipe assembly rotates.

6. Connecting apparatus according to claim 5, in which the flexible pipe has one end that is connected to the water supply facility and an opposite end that is connected to the pipe assembly.

7. Connecting apparatus according to claim 6, in which the flexible pipe is disposed in a U shape when it is in use.

8. Connecting apparatus according to claim 1, comprising means to enable the pipe assembly to move radially in relation to the central location as the pipe assembly rotates.

9. Connecting apparatus according to claim 1, in which the connecting apparatus comprises a member that can be mounted on the connecting apparatus and around which the flexible connector can be passed, with one end of flexible connector anchored on the take up member and an opposite end of the flexible connector that on the water supply facility.

10. Connecting apparatus according to claim 1, for use with irrigation equipment in which the water supply facility includes an uprightly disposed water supply pipe about which the pipe assembly rotates, the connecting apparatus being arranged to connect the pipe assembly to the supply pipe and being provided with means to vary the distance between the or each ground wheel and the supply pipe as the pipe assembly rotates.

11. Irrigation equipment that includes a pipe assembly comprising one or more water delivery pipes arranged to rotate about a central location while being supported above the ground by one or more ground wheels, the irrigation equipment including connecting apparatus according to claim 1, for connecting the pipe assembly to a water supply facility.

* * * * *